United States Patent [19]

Kubo et al.

[11] 4,441,594

[45] Apr. 10, 1984

[54] FLUID TYPE TORQUE CONVERTER APPARATUS

[75] Inventors: Seitoku Kubo, Toyota; Koujiro Kuramochi, Okazaki; Tatsuo Kyushima, Toyota, all of Japan

[73] Assignee: Toyota Jidosha Kogyo Kabushiki Kaisha, Toyota, Japan

[21] Appl. No.: 274,807

[22] Filed: Jun. 18, 1981

[30] Foreign Application Priority Data

Jul. 10, 1980 [JP] Japan .................................. 55-94693

[51] Int. Cl.³ .......................... F16H 3/66; F16H 45/02
[52] U.S. Cl. ................................. 192/3.28; 192/106.2
[58] Field of Search ................. 192/106.2, 106.1, 3.28, 192/3.29, 3.3, 3.31, 89 B

[56] References Cited

U.S. PATENT DOCUMENTS

| | | | |
|---|---|---|---|
| 3,414,101 | 12/1968 | Binder et al. | 192/106.2 |
| 4,044,556 | 8/1977 | Kuramochi et al. | 192/3.28 X |
| 4,162,002 | 7/1979 | Dubiel et al. | 192/89 B |
| 4,197,931 | 4/1980 | Norcia | 192/106.2 |
| 4,289,220 | 9/1981 | Onuma et al. | 192/106.2 X |

FOREIGN PATENT DOCUMENTS 511798 8/1939 United Kingdom .............. 192/106.2

*Primary Examiner*—George H. Krizmanich
*Attorney, Agent, or Firm*—Finnegan, Henderson, Farabow, Garrett & Dunner

[57] ABSTRACT

A lockup clutch of a fluid type torque converter apparatus is disposed in parallel to a fluid type torque converter and directly connects an input shaft and an output shaft to each other. The lockup clutch comprises first and second disc elements disposed midway of a drive force transmission line in an axially spaced relation and an opposing relation to each other, and connected to each other by fastening members in a manner that the relative rotation of one disc element to another is impeded; a third disc element disposed between the first and second disc elements and rotatable relative to the first and second disc elements; compression coil springs adapted to act as shock absorbers when the first and second disc elements are rotated relative to the third disc element; slots of a predetermined length running in the third disc in the circumferential direction thereof and receiving therein the fastening members, respectively; and spacers formed independently of the fastening members and fitted on the intermediate outer peripheral portions of the fastening members, which intermediate portions are inserted in the slots, respectively.

4 Claims, 2 Drawing Figures

FLUID TYPE TORQUE CONVERTER APPARATUS

BACKGROUND OF THE INVENTION

1. Field of the Invention

This invention relates to a lockup clutch of a fluid type torque converter apparatus.

2. Description of the Prior Art

A fluid type torque converter apparatus is known as a device incorporated in a drive force transmission system of an automobile. Such a fluid type torque converter apparatus generally includes; an input shaft, an output shaft, an pump impeller, a turbine runner and stator, the pump impeller and turbine runner and stator being incorporated between the input shaft and the output shaft, and a lockup clutch built in between the input shaft and the output shaft and selectively connecting the input shaft and the output shaft to each other. The lockup clutch of the fluid type torque converter apparatus of the type includes a circular clutch disc fitted into a piston, and circular driven discs which are disposed on the opposite sides of the circular clutch disc, and one of which is connected to a turbine shaft which is the output shaft. The clutch disc and driven discs are assembled by rivets relatively rotatably, with the aid of two or more compression coil springs extending circumferentially of and over the clutch disc and these two driven discs. The relative rotation of the driven discs to the clutch disc is permitted only within the range of the length of circumferential slots provided in the clutch disc. The rivets respectively consist of a diametrically large portion piercing through each of circumferential slots provided in the clutch disc on the same radius thereof and held between the two driven discs when assembled, and diametrically small end portions fitted into the rivet holes provided in the driven discs. These rivets fasten one driven disc, the clutch disc and another driven disc to one another in the order described. The diametrically large portion of each rivet engages one longitudinal edge of respective slot provided in the clutch disc, for the centering of the clutch disc, and is adapted to slidingly move along the one longitudinal edge of each slot when an inputted torque changes or the piston engages the housing. For this reason, the diametrically large portion of individual rivet must be subjected to a heat treatment for hardening of the outer peripheral surface thereof. To apply the heat treatment to the diametrically large portion alone of individual rivet is undesirable for the good productivity, and should the diametrically small portions of a rivet be inadvertently heated, then a rupture would develop at the rivet head at the time of formation of the rivet head.

SUMMARY OF THE INVENTION

It is accordingly an object of the present invention to provide a lockup clutch of a fluid type torque converter apparatus, wherein a fastening head forming portion of respective rivet used as a fastening means remains independent of an undesired influence due to a heat treatment.

To attain the above object, there is provided according to the present invention a lockup clutch of a fluid type torque converter apparatus, wherein elements to be held between two driven discs and to be heated for hardening are provided separately from fastening means.

The fastening means need no longer be heated for hardening, with the freedom of a rupture at the fastening head which could occur when the fastening head from the rivet is fabricated.

Preferably, the fastening means is a rivet, and rivet holes are provided in first and second disc elements. The ends of respective rivets are fitted in the rivet holes, whereby the first and second disc elements are fastened to each other, so that the relative rotation between these two discs can not be allowed.

DESCRIPTION OF THE PREFERRED EMBODIMENTS

Figure 1:
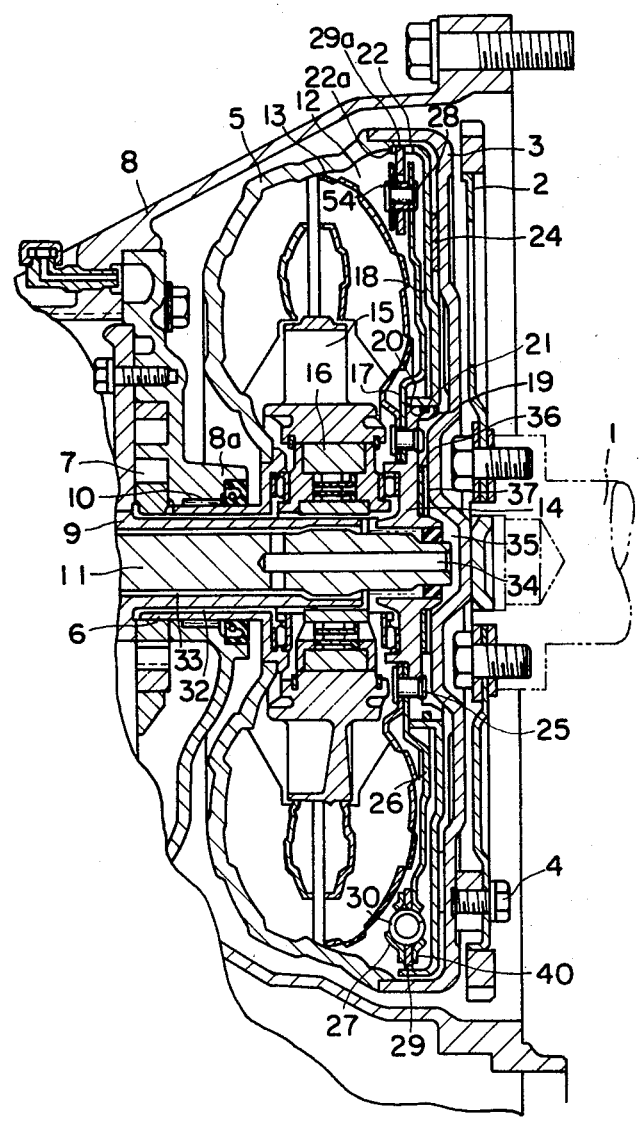
FIG. 1 is a fragmentary longitudinal cross sectional view of a fluid type torque converter apparatus equipped with a lockup clutch, according to the present invention.

Referring first to FIG. 1, an input shaft 1 is rotated clockwise (as viewed from the right of FIG. 1) by an engine (not shown). Mounted on the input shaft 1 is a fly wheel 2, to which a front cover 3 is bolted as at 4, so that the fly wheel 2 and the front cover 3 are integrally rotated. The circumferential portion of the front cover 3 is connected to the circumferential portion of a pump impeller 5. The pump impeller 5 is supported by a hollow shaft 6 coaxial with the input shaft 1, so as to operate a hydraulic pump 7 by way of the hollow shaft. The hollow shaft 6 is rotatably carried by an oil pump cover 8a which in turn surrounds a sleeve 9 fixed by a torque converter housing 8, and is attached through the medium of a bearing element 10 to the housing 8.

An output shaft 11 extends through the hollow shaft 9 coaxially therewith. A turbine runner 13 is disposed in an opposing relation to the pump impeller 5 within a fluid chamber 12 defined by the front cover 3 and the pump impeller 5, and connected through the medium of a hub 14 to the output shaft 11, so as to transmit torque thereto. A stator 15 adapted to lead a fluid from the turbine runner to the pump impeller is provided between the pump impeller 5 and the turbine runner 13. The stator 15 is supported through the medium of a one-way clutch 16 on the sleeve 9.

The hub 14 is formed with a cylindrical portion 17 along the outer circumferential edge thereof, with the outer peripheral surface of which slidingly engages the inner peripheral surface of a cylindrical portion 19 formed along the inner circumference of a circular piston 18 disposed within the fluid chamber 12. The outer peripheral wall of the cylindrical portion 17 is provided with an annular groove 20, into which is fitted a seal ring 21, so as to provide sealing between the outer peripheral wall of the cylindrical portion 17 of the hub 14 and the inner peripheral wall of the cylindrical portion 19 of the piston element 18. The piston element 18 has a piston-shaped outer peripheral wall 22 along the outer circumferential edge thereof.

A plurality of slots 22a are provided at a given angular spacing from each other in the piston-shaped outer peripheral wall 22. A driven disc 26 is attached by means of rivets 25 to the hub 14. An annular driven disc 27 is disposed in an opposing relation to the driven disc 26. These two driven discs 26 and 27 are fastened to each other by means of rivets 28 driven in these discs at a spacing from each other in the circumferential direction thereof. An annular clutch disc 29 is disposed between the driven discs 26 and 27 rotatably relative to these discs as well as the rivets 28 coupling same. The clutch disc 29 has outer circumferential projections 29a, which in turn are engageably fitted into slots 22a provided in the outer peripheral portion 22 of the piston element 18, so as to permit transmission of torque.

A plurality of compression coil springs 30 are set at a spacing from each other in the circumferential portion of and among the driven discs 26, 27 and the clutch disc 29 in the manner to be described later, thereby imparting flexibility in the direction of rotation to these discs 26, 27 and 29, whereby the assembly of discs, rivets and compression coil springs forms a rotary damper acting between the piston element 18 and the hub 14.

Figure 2:
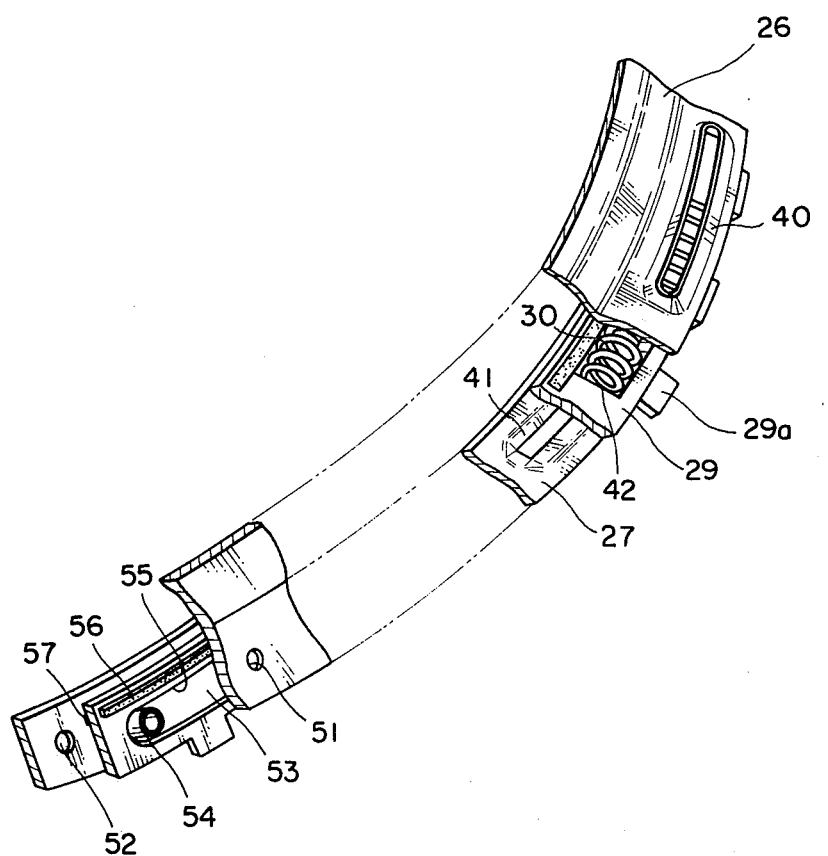
FIG. 2 is an exploded perspective view of the lockup clutch portion with a spacer built therein.

The assembly in which a spacer 54 is built in will be more in detail described with reference to FIG. 2.

A plurality of arcuate, axially bulged portions 40 are provided in the circumferential portion of the driven disc 26 in a circumferentially spaced relation to each other. A plurality of arcuate axially bulged portions 41 are provided in the circumferential portion of the driven disc 27 in register with the plurality of arcuate bulged portions 40 in the driven disc 26. The plurality of arcuate bulged portions 40 in the driven disc 26 are in an opposed relation to the plurality of arcuate bulged portions 41 in the driven disc 27, as viewed in the axial direction of the torque converter apparatus, and the bottom walls of the former and those of the latter project in the opposite directions when the driven discs 26 and 27 are assembled. A plurality of arcuate openings 42 are provided, in register with the arcuate bulged portions 40 and 41, in the circumferential portion of the clutch disc 29 which is to be located between the driven discs 26 and 27 when assembled. Compression coil springs 30 are set in the spaces defined by the arcuate openings 42, the arcuate bulged portions 40 and 41, respectively.

Rivet holes 51 and 52 are provided in the circumferential portions of the driven discs 26 and 27, between adjacent arcuate bulged portion 40 and 41 in these discs. Slots 53 are provided in the clutch disc 29 in a facing relation to rivet holes 51 and 52 in the driven discs 26 and 27, respectively.

A hardened tubular spacer 54 is fitted into respective slot 53, with the outer peripheral surface thereof engaging the one longitudinal edge of each slot 55, so that when the driven discs 26 and 27 are rotated relative to the clutch disc 29, the tubular spacers 54 are slidingly moved along the one longitudinal edges of slots 53, respectively. The opposite ends of the spacers 54 engage the side surfaces of driven discs 26 and 27, respectively. Respective rivet 28 is fitted into the rivet holes 51 and 52 in the driven discs and the through-hole of respective spacer 54 in the manner shown in FIG. 1, whereby the driven discs 26 and 27 are permitted to integrally rotate in a given direction, and on the other hand, the clutch disc 29 is allowed to rotate relative to the driven discs 26 and 27 within the range of the length of respective slot 53.

Straps of friction material 56 and 57 are bonded to the opposite sides of the clutch disc 29. The clutch disc 29 is maintained in engagement with the driven discs 26 and 27 through the medium of these straps of friction material 56 and 57. When the relative rotation of the driven discs 26 and 27 to the clutch disc 29 takes place, hysteresis arises with the relative rotation due to friction of the driven discs 26 and 27 to the straps of friction material 56 and 57.

In operation, when it is desired to operate the lockup clutch, a hydraulic pressure is supplied via the oil path 32, and then from the base portion of the stator 15 into the fluid chamber 12. The piston element 18 will be urged toward the front cover 3 and brought into frictional engagement with the front cover 3 through the medium of the lining 24. The drive force will be mechanically transmitted from the input shaft 1, by way of the front cover 3, piston element 18, clutch disc 29, compression coil springs 30, driven discs 26 and 27 and hub 14, to the output shaft 11. If torque abruptly increases in the process of the transmission of the drive force described above, then the compression coil springs are instantaneously compressed to a large extent, so as to absorb the increment of torque, thereby preventing occurance of a large change in the transmission of the drive force, namely, the compression coil springs acting as shock absorbers. When the hydraulic pressure is fed through the oil path 33 and introduced, by way of the groove 34 running in the output shaft 11, the chamber 35, the groove 37 in the washer 36, into the space between the piston element 18 and the front cover 3, then the piston element 18 is moved away from the front cover 3, thus disengaging from the lining 24. Transmission of the drive force from the input shaft 1 to the output shaft 11 in this case takes place through the torque converter consisting of the pump impeller 5, turbine runner 13, and the stator 15.

According to the present invention, since spacers 54 are provided separately from the rivets 28 fitted into the rivet holes in the driven discs 26 and 27, respective rivets 28 need not be subjected to the heat treatment for hardening, for preventing formation of a rupture at the fastening head of respective rivet at the time of formation of the fastening head. Use of the spacers 54 slightly different in axial length promotes the fine adjustment of hysteresis which occurs at the relative rotation between the driven discs 27, 26 and the clutch disc 29. Use of the spacers 54 of slightly different thicknesses ensures accuracy in centering of the clutch disc 29.

What is claimed is:

1. In a fluid type torque converter apparatus including an input shaft, an output shaft, a fluid type torque converter provided between said input and output shafts, and a lockup clutch provided in parallel with said fluid type torque converter for directly connecting said input and output shafts, said lockup clutch comprising:

(a) first and second disc elements disposed in axially spaced, opposed relation to each other, said first and second disc elements having a plurality of circumferentially elongated, complementary protrusions defining cavities spaced about the circumference thereof, one of said first and second disc elements being drivingly connected to said output shaft;

(b) a third disc element being selectively connected in driving relation to said input shaft and being axially disposed between for relative rotation with respect to said first and second disc elements, said third disc element having a plurality of first elongated slots circumferentially spaced for cooperation with said cavities and a plurality of second elongated slots of a given length circumferentially spaced and located between adjacent first elongated slots;

(c) a compression coil spring disposed in each said cavity and cooperating first elongated slot, said springs acting as shock absorbers for relative rotation between said first and second disc elements and said third disc element;
(d) a plurality of elongated fasteners axially interconnecting and preventing relative rotation between said first and second disc elements, one said fastener being disposed in each said second elongated slot of said third disc element; and
(e) a plurality of heat-hardened spacers for axial spacing said first disc element relative to said second disc element, said spacers being forced independently of said fasteners, one said spacer being disposed on an intermediate portion of each said fastener and being received in a respective second elongated slot, each said spacer slidably engaging one longitudinal edge of its respective second elongated slot for centering said third disc element relative to said interconnected first and second disc elements.

2. A fluid type torque converter apparatus as defined in claim 1, wherein said fasteners are rivets.

3. A fluid type torque converter apparatus as defined in claim 2, wherein said first and second disc elements are provided with rivet holes, respectively, and the ends of the rivets are fitted into said rivet holes.

4. Apparatus as in claim 1 wherein friction layer means are positioned between said first and third disc elements and between said second and third disc elements for maintaining frictional engagement between said third disc element and said interconnected first and second disc elements, the apparatus further comprising means for adjusting the hysteresis characteristic of the frictionally engaged disc elements, said adjusting means wherein said spacers have different axial lengths.

* * * * *

UNITED STATES PATENT AND TRADEMARK OFFICE
CERTIFICATE OF CORRECTION

PATENT NO. : 4,441,594
DATED : April 10, 1984
INVENTOR(S) : Seito Kubo
Koujiro Kuramochi, Tatsuo Kyushima It is certified that error appears in the above—identified patent and that said Letters Patent is hereby corrected as shown below:

Column 5, line 13, change "forced" to --formed--.

Signed and Sealed this

Fifth Day of March 1985

[SEAL]

Attest:

DONALD J. QUIGG

Attesting Officer Acting Commissioner of Patents and Trademarks